United States Patent
Araki

(10) Patent No.: US 7,682,254 B2
(45) Date of Patent: Mar. 23, 2010

(54) CROSS JOINT AND VEHICULAR STEERING SYSTEM INCLUDING THE SAME

(75) Inventor: Satoshi Araki, Osaka (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 322 days.

(21) Appl. No.: 11/798,605

(22) Filed: May 15, 2007

(65) Prior Publication Data

US 2007/0270228 A1 Nov. 22, 2007

(30) Foreign Application Priority Data

May 16, 2006 (JP) ............................... 2006-136106

(51) Int. Cl.
*F16D 3/41* (2006.01)
(52) U.S. Cl. ..................... 464/128; 464/132
(58) Field of Classification Search ............. 464/128, 464/130, 132, 136; 384/560, 564
See application file for complete search history.

(56) References Cited

U.S. PATENT DOCUMENTS

| 1,917,452 A | * | 7/1933 | Lott | ........................... 384/564 |
| 2004/0166947 A1 | | 8/2004 | Mizuno et al. | |

FOREIGN PATENT DOCUMENTS

| DE | 1 83 3 059 U | | 6/1961 | |
| DE | 86 31 594 U1 | | 1/1987 | |
| DE | 102 04 563 A1 | | 8/2003 | |
| FR | 2 389 037 A | | 11/1978 | |
| GB | 832784 | * | 4/1960 | ................. 464/132 |
| GB | 878997 | * | 10/1961 | ................. 464/132 |
| GB | 1 201 495 | * | 8/1970 | ................. 464/130 |
| WO | WO 03/064877 A1 | | 8/2003 | |

* cited by examiner

*Primary Examiner*—Greg Binda
(74) *Attorney, Agent, or Firm*—Birch, Stewart, Kolasch & Birch, LLP

(57) ABSTRACT

A cross joint is provided which is adapted to prevent a shaft portion and rollers from being damaged when a bearing cup having the rollers on an inner periphery thereof is assembled to a cross shaft. The cross joint includes: a cross shaft 1 including four shaft portions 3; a closed-end cylindrical bearing cup 5; and plural needle rollers 6 having the first end portions thereof located on an opening side of the bearing cup 5 and arranged along the raceway surface of the bearing cup 5. An inner periphery of the bearing cup 5 includes a tapered surface portion. 11 increased in diameter toward the opening side. When the plural needle rollers 6 arranged along the inner periphery of the bearing cup 5 are fitted about the shaft portion 3, the tapered surface portion 11 allows the needle rollers 6 to incline as shifting the first end portions radially outwardly.

7 Claims, 7 Drawing Sheets

CROSS JOINT AND VEHICULAR STEERING SYSTEM INCLUDING THE SAME

TECHNICAL FIELD

The present invention relates to a cross joint and a vehicular steering system including the same.

BACKGROUND ART

In an automotive steering system, for example, a cross joint is used for interconnecting a column shaft and a steering shaft. The cross joint includes: a cross shaft including four shaft portions projecting in four directions from a side periphery of a body portion thereof; a plurality of rollers rolling on outer peripheries of the shaft portions; and closed-end cylindrical bearing cups fitted on these rollers. Each of the above shafts is provided with a pair of opposing yokes at an end thereof. Each shaft portion of the cross shaft is axially rotatably supported by a bearing hole formed in each yoke via the bearing cup having the plural rollers arranged on an inner periphery thereof.

When transfer torque is increased in a joint structure including such a cross joint, the rollers may be caused to slip so that the joint structure may encounter backlash or pulsations due to torque transfer failure.

In order to solve this problem, the following structure, such as disclosed in Patent Document 1 (International Publication No. WO2003-064877), has been proposed in the art. The structure is constituted such that the rollers and the shaft portions of the cross shaft are in interference fit relation.

The joint structure including the cross joint according to Patent Document 1 is assembled as follows. In a state where a shaft portion 44 of a cross shaft 43 is inserted in a bearing hole 42 of a yoke 41, as shown in FIG. 7, a bearing cup 46 having plural rollers 45 arranged on an inner periphery thereof is moved toward the shaft portion 44 from place axially outwardly of the shaft portion 44. While the bearing cup 46 is press inserted into the bearing hole 42, the rollers 45 in the bearing cup 46 are fitted about the shaft portion 44 via a distal end thereof. This causes the bearing cup 46 to be decreased in diameter, so that the rollers 45 and the shaft portion 44 are brought into pressure contact with each other, or brought into the interference fit relation or a state where the rollers and the shaft portion define zero clearance therebetween.

However, the rollers 45 on the inner periphery of the bearing cup 46 may be brought into hard contact against an outside circumference edge (corner) 47 of a distal end face of the shaft portion 44 because the bearing cup 46 is decreased in diameter by the press-insertion into the bearing hole 42 when the rollers 45 in the bearing cup 46 are fitted about the shaft portion 44. This leads to fear that the outer periphery of the shaft portion 44 defining a rolling contact surface, and the rollers 45 may sustain damages (indentation) or deformation. Particularly at the initial stage of the fitting engagement when the rollers 45 come into contact with the distal end of the shaft portion 44, the distal end of the shaft portion 44 is susceptible to damages due to a great pressure on a contact surface between the rollers 45 and the shaft portion 44. If the rolling contact surface of the shaft portion 44 and the rollers 45 sustain damages in this manner, the joint structure may be decreased in performance and durability.

SUMMARY OF THE INVENTION

The invention has been accomplished in the light of the foregoing problem and has an object to provide a cross joint adapted to prevent the shaft portion and the rollers from being damaged when the bearing cup having the rollers on the inner periphery thereof is assembled to the cross shaft, and to provide a vehicular steering system including the same.

Means for Solving the Problem

According to the invention for achieving the above object, this cross joint comprises: a cross shaft including four shaft portions projecting in four directions from a side periphery of a body portion thereof; a closed-end cylindrical bearing cup including a raceway surface on an inner periphery thereof and opening toward the body portion; and a plurality of needle rollers having the first end portions thereof located on an opening side of the bearing cup, arranged along the raceway surface of the bearing cup and fitted about the shaft portion, and is characterized in that the inner periphery of the bearing cup includes a tapered surface portion which allows the needle rollers to incline as shifting the first end portions radially outwardly when the plural needle rollers arranged along the inner periphery of the bearing cup are fitted about the shaft portion.

According to this cross joint, the tapered surface portion on the inner periphery of the bearing cup allows the plural needle rollers arranged along the inner periphery of the bearing cup to incline as shifting the first end portions radially outwardly when the needle rollers are fitted about the shaft portion of the cross shaft via the distal end thereof. Thus, the end faces of the first end portions of the needle rollers are prevented from engagingly making hard contact against the outside circumference edge (corner) of the distal end face of the shaft portion. Therefore, the distal end of the shaft portion and the needle rollers may be prevented from being damaged.

According to the above cross joint, it is preferred that the raceway surface is formed continuous to a smaller-diameter end portion of the tapered surface portion.

According to this constitution, when the bearing cup with the needle rollers allowed to incline by the tapered surface portion is further pressed toward a proximal end side of the shaft portion in order to fit the needle rollers in the bearing cup about the shaft portion of the cross shaft, the needle rollers are clamped between the raceway surface of the bearing cup and the outer periphery of the shaft portion so as to be positioned to direct their axes in parallel to an axis of the bearing cup. Thus, the needle rollers may be arranged along the raceway surface. In short, a predetermined assembled state may be established by forcing the bearing cup toward the proximal end side of the shaft portion.

According to the invention, a vehicular steering system comprises: a steering shaft; a column shaft; and a joint for interconnecting the steering shaft and the column shaft and is characterized in that the joint is the above cross joint.

This constitution is adapted to obviate the damages on the shaft portion of the cross shaft and the needle rollers rolling on the outer periphery of the shaft portion. Hence, the vehicular steering system may be enhanced in quality and durability.

BEST MODE FOR CARRYING OUT THE INVENTION

An embodiment of the invention will hereinbelow be described with reference to the accompanying drawings.

Figure 1:
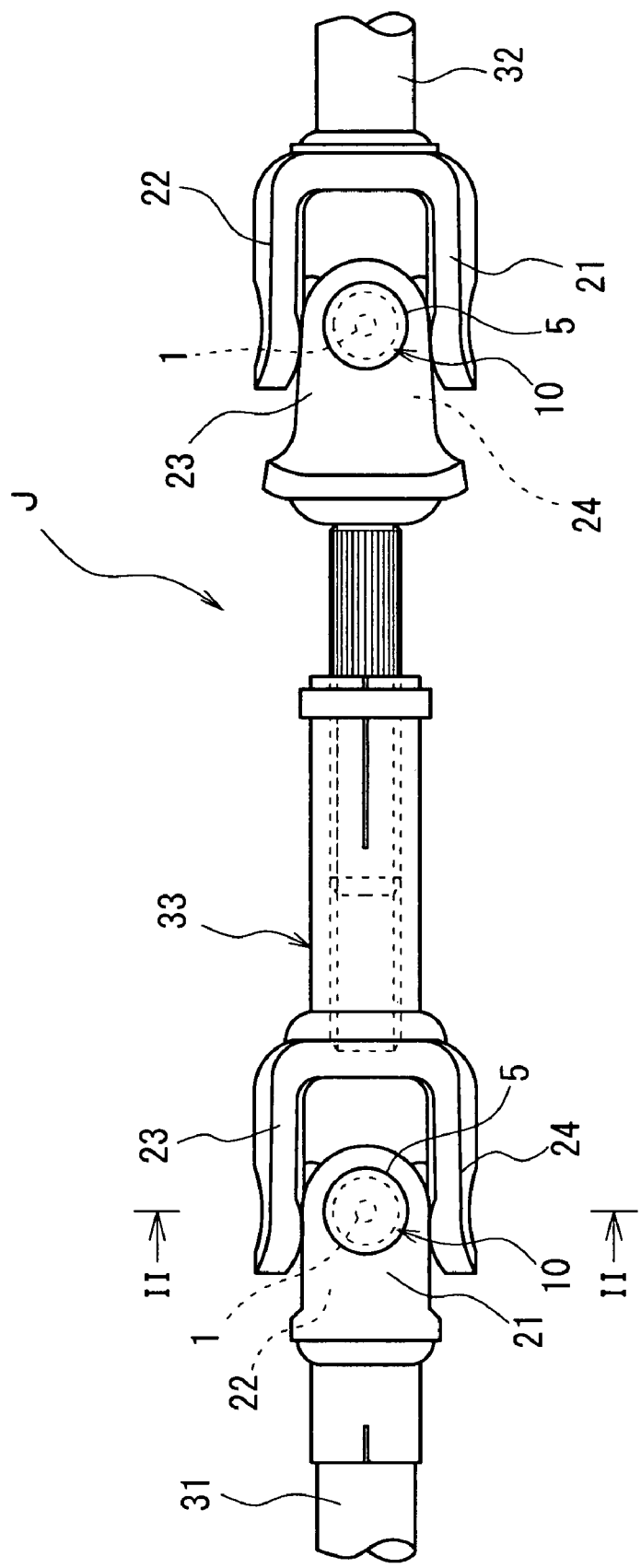
FIG. 1 is a side view illustrating one embodiment of a universal joint including a cross joint according to the invention.
Figure 2:
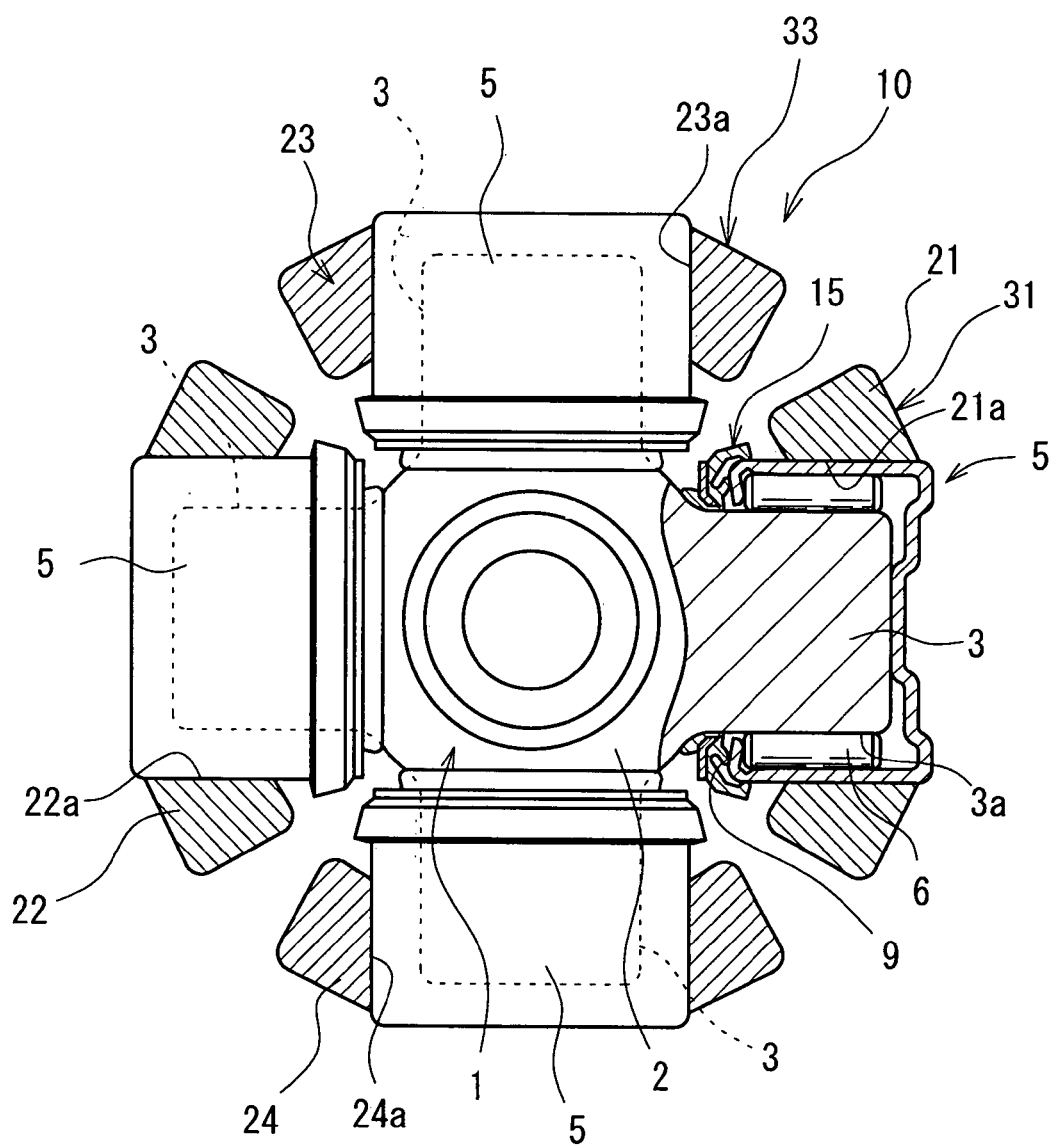
FIG. 2 is a sectional view taken on the line II-II in FIG. 1.

FIG. 1 is a side view illustrating one embodiment of a universal joint including a cross joint according to the invention. FIG. 2 is a sectional view taken on the line II-II in FIG. 1. The universal joint J may be used in, for example, an automotive steering system for interconnecting a steering shaft 31 and a column shaft 32. According to the embodiment shown in FIG. 1, an intermediate shaft 33 is interposed between these shafts 31, 32. A cross joint 10 is provided for interconnecting the ends of the intermediate shaft 33 and the steering shaft 31 and for interconnecting the ends of the intermediate shaft 33 and the column shaft 32, respectively.

A pair of yokes 21, 22 in opposing relation are provided at the end of the steering shaft 31. The yokes 21, 22 are respectively formed with bearing holes 21a, 22a, which have common axis. On the other hand, a pair of yokes 23, 24 in opposing relation are provided at the end of the intermediate shaft 33. The yokes 23, 24 are respectively formed with bearing holes 23a, 24a, which have common axis.

The cross joint 10 includes: a cross shaft 1 including four shaft portions 3; a plurality of needle rollers 6 as a rolling element fitted about the shaft portions 3 and rolling on outer peripheries 3a thereof; closed-end cylindrical bearing cups 5 fitted on these needle rollers 6.

The individual shaft portions 3 of the cross shaft 1 are axially rotatably supported in the respective bearing holes 21a, 22a, 23a, 24a via the closed-end cylindrical bearing cups 5 each having the plural needle rollers 6 arranged on an inner periphery thereof. A structure between the intermediate shaft 33 and the column shaft 32 is the same and hence, the description thereof is dispensed with.

Figure 3:
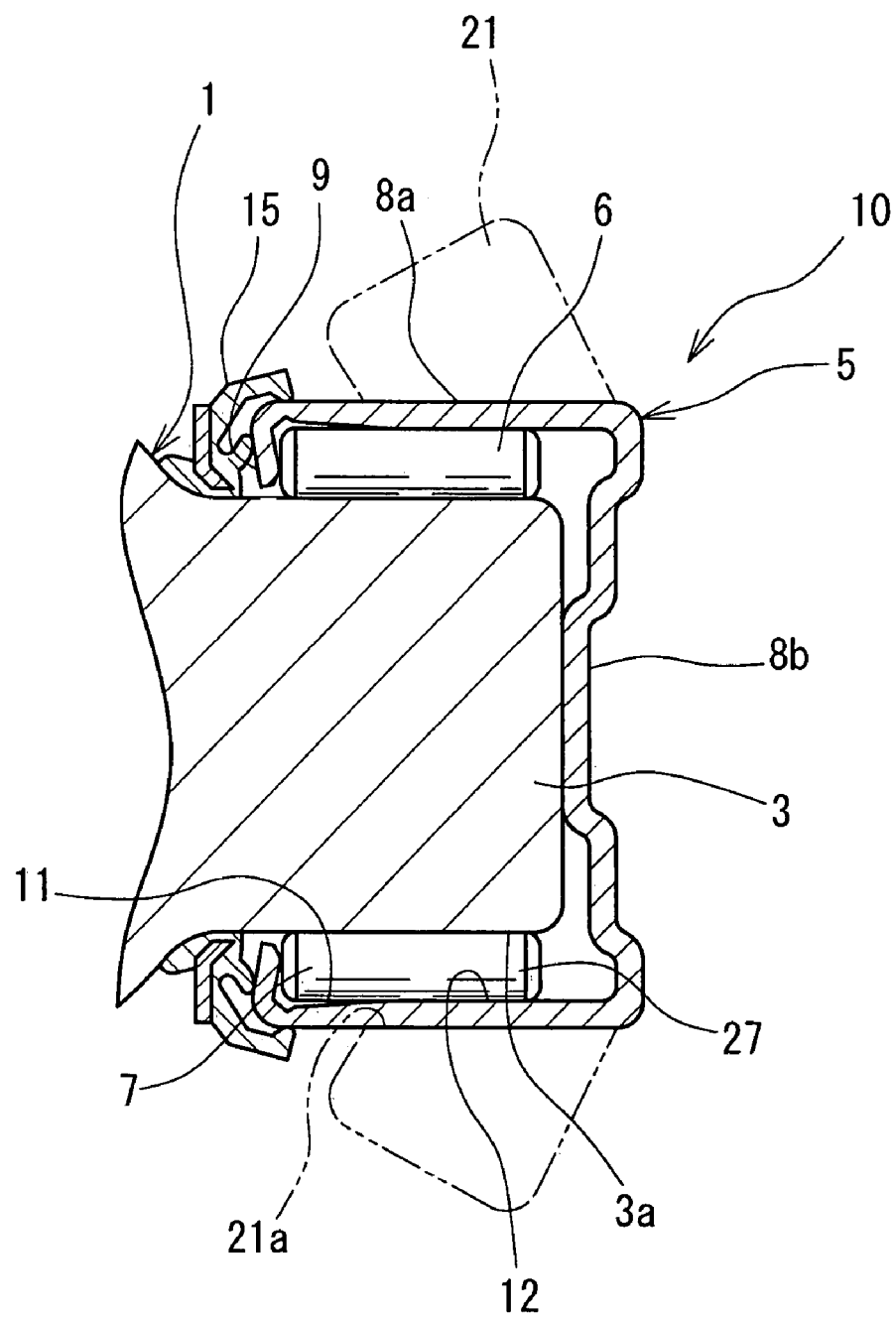
FIG. 3 is a sectional view showing an essential part of the cross joint.

FIG. 3 is a sectional view of the cross joint, showing an essential part of the yoke 21. Referring to FIG. 2 and FIG. 3, the cross shaft 1 including a body portion 2 and the four shaft portions 3 projecting in four directions from a side periphery of the body portion 2 is made of steel. The body portion 2 and the four shaft portions 3 are formed in one piece by forging.

The bearing cup 5 includes: a cylindrical portion 8a; and a stepped disk portion 8b continuous to an end of the cylindrical portion 8a. The bearing cup 5 is shaped like a closed-end cylinder opening on axial one side thereof. As assembled to the cross shaft 1, the bearing cup 5 opens toward the body portion 2 of the cross shaft 1. The bearing cup 5 is formed with an inner rib portion 9 at an opening thereof. The inner rib portion is formed by radially inwardly bending the opening of the bearing cup 5.

The plural needle rollers 6 are arranged along an inner periphery of the cylindrical portion 8a of the bearing cup 5. A part of the inner periphery of the cylindrical portion 8a constitutes a raceway surface 12 for the needle rollers 6. The needle rollers 6 and the bearing cups 5 are made of steel. An opening side of the bearing cup 5 is defined as a first axial end 7 side of the needle roller 6, whereas a bottom side of the bearing cup 5 is defined as a second axial end 27 side of the needle roller.

The bearing cup 5 has its cylindrical portion 8a fitted in the bearing hole 21a of the yoke 21. In a state where the cross joint 10 is assembled, the cylindrical portion 8a and the bearing hole 21a are maintained in interference fit relation. In the bearing cup 5, the plural needle rollers 6 and the shaft portion 3 of the cross shaft 1, and the needle rollers 6 and the bearing cup 5 are maintained in interference fit relation. Specifically, the assembled needle rollers 6 provide a radial clearance of negative value. Alternatively, the needle rollers 6 may also provide a radial clearance of zero.

Referring to FIG. 3, the bearing cup 5 includes: a tapered surface portion 11 on the opening side; and the raceway surface 12 on the bottom side (on the disk portion 8b side), the tapered surface portion 11 and raceway surface 12 defined on the inner periphery of the cylindrical portion 8a.

Figure 4:
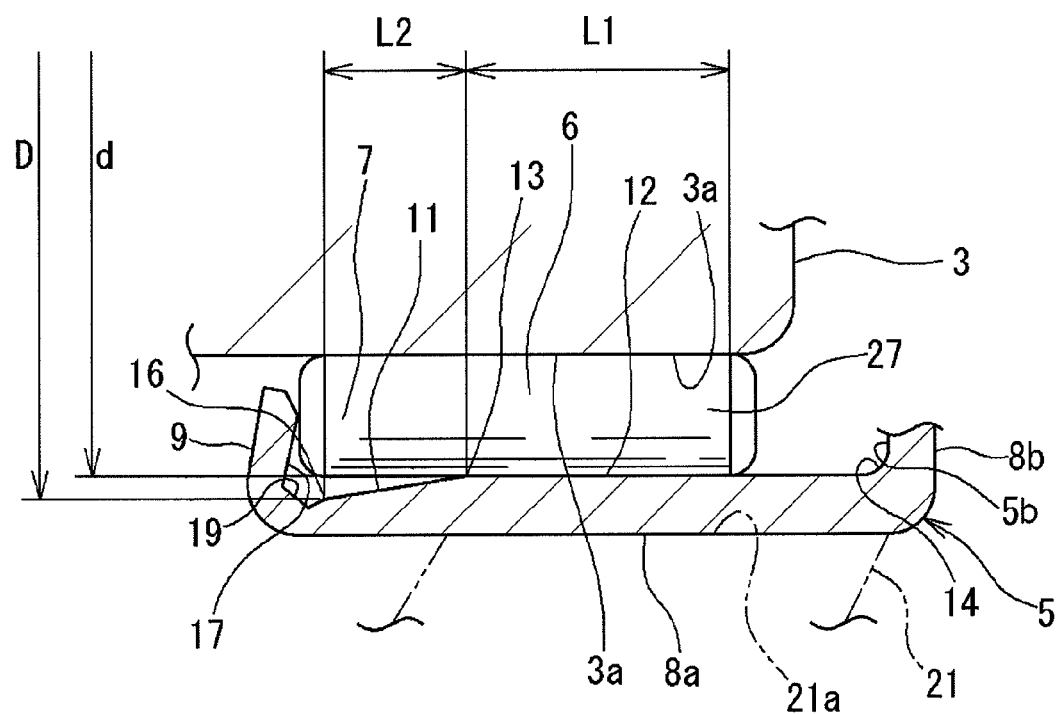
FIG. 4 is an enlarged sectional view showing the essential part of the cross joint.
Figure 5:
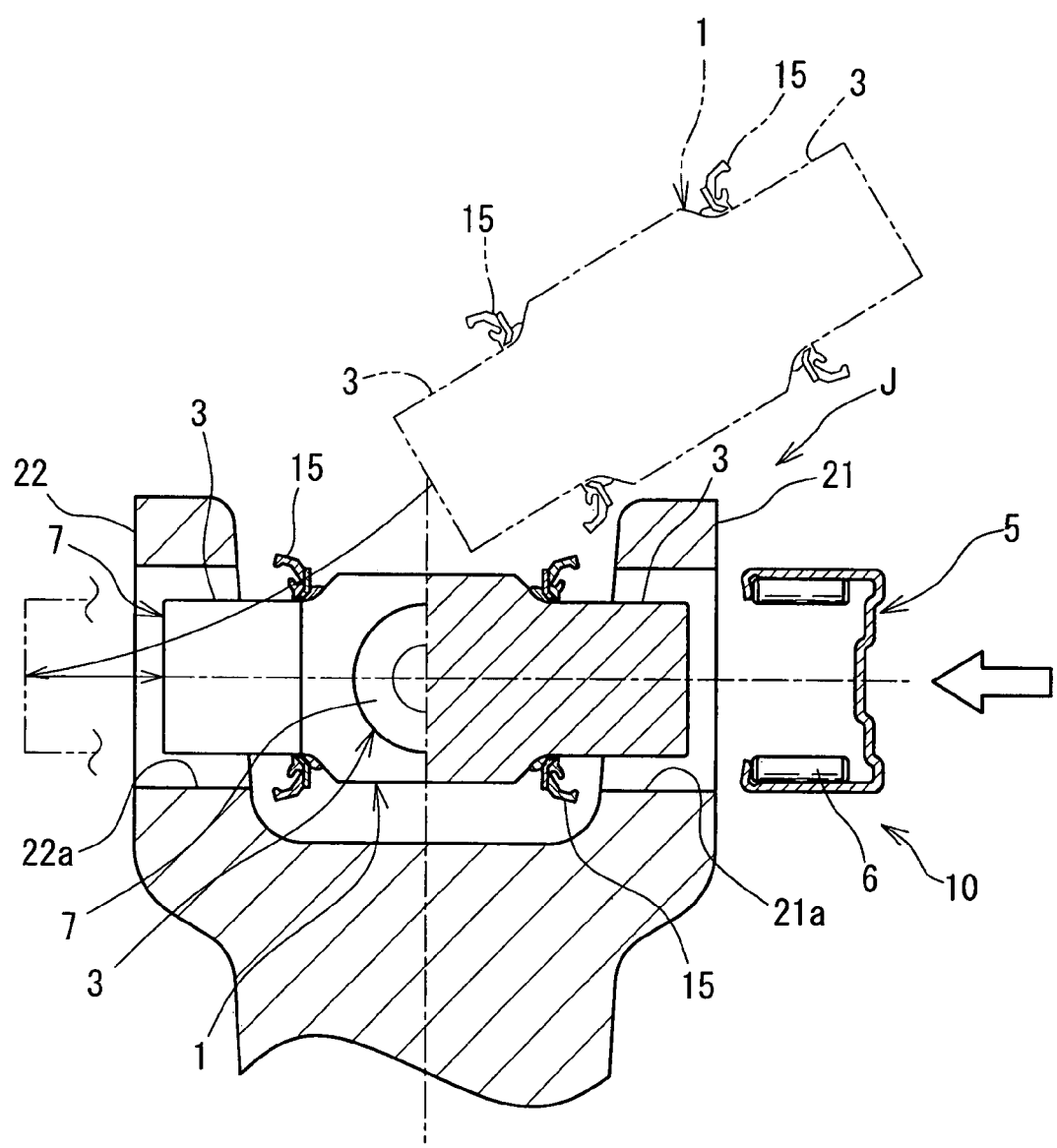
FIG. 5 is a sectional view explaining how to assemble the universal joint.

FIG. 4 is an enlarged sectional view showing an essential part of the cross joint. The tapered surface portion 11 defines a tapered surface linearly increased in diameter toward the opening side. The raceway surface 12 defines a cylindrical surface linearly extended in parallel to an axis of the bearing cup 5. The tapered surface portion 11 is continued from its greater-diameter end portion 16 to an inside surface 17 of the inner rib portion 9 via a recess 19 increased in diameter. The raceway surface 12 is continuously, linearly extended from a smaller-diameter end portion 13 of the tapered surface portion 11 toward the bottom of the bearing cup 5, so as to be continued to an inside bottom surface 5b of the disk portion 8b of the bearing cup 5 via an inner rounded surface 14.

Of the raceway surface 12, a contact portion in contact with the needle rollers 6 has an axial length L1, which is defined to be greater than an axial length L2 of a portion of the tapered surface portion 11, which radially opposes the needle rollers 6.

As shown in FIGS. 2-7, the cylindrical bearing cup 5 has a closed end and an open end wherein the raceway surface is on an inner periphery thereof beginning adjacent to the closed end and extending toward the body portion 2, and the inner periphery of the bearing cup 5 includes a tapered surface portion 11 which begins at an end of the raceway surface 12 and extends toward the open end of the cylindrical bearing cup 5 and the needle rollers 6 have a length such that the rollers 6 are coextensive with major portions of both the raceway surface 12 and the tapered surface portion 11 such that the first end portions of the needle rollers 6 pivot radially outwardly against the tapered surface portion 11 when the plural needle rollers 6 arranged along the inner periphery of the bearing cup 5 are fitted about the shaft portion 3.

Next, description is made on an assembly method of this universal joint J. As indicated by a chain double-dashed line in FIG. 5, an annular seal member 15 is previously mounted to a proximal end of the shaft portion 3 of the cross shaft 1. The cross shaft 1 is diagonally moved toward one yoke 22 of the yoke pair 21, 22 in opposing relation, so as to insert one of the shaft portions 3 of the cross shaft 1 into the bearing hole 22a of the yoke 22. Thereafter, the shaft portion 3 on the opposite side is inserted into the bearing hole 21a of the other yoke 21. In the state where the shaft portion 3 of the cross shaft 1 is previously inserted into the bearing hole 21a, the bearing cup 5 having the plural needle rollers 6 arranged on the inner periphery thereof is moved toward the shaft portion 3 from place axially outside of the shaft portion 3. The needle rollers 6 in the bearing cup 5 are fitted about the shaft portion 3 via its distal end as press-inserting the bearing cup 5 into the bearing hole 21a.

Figure 6:
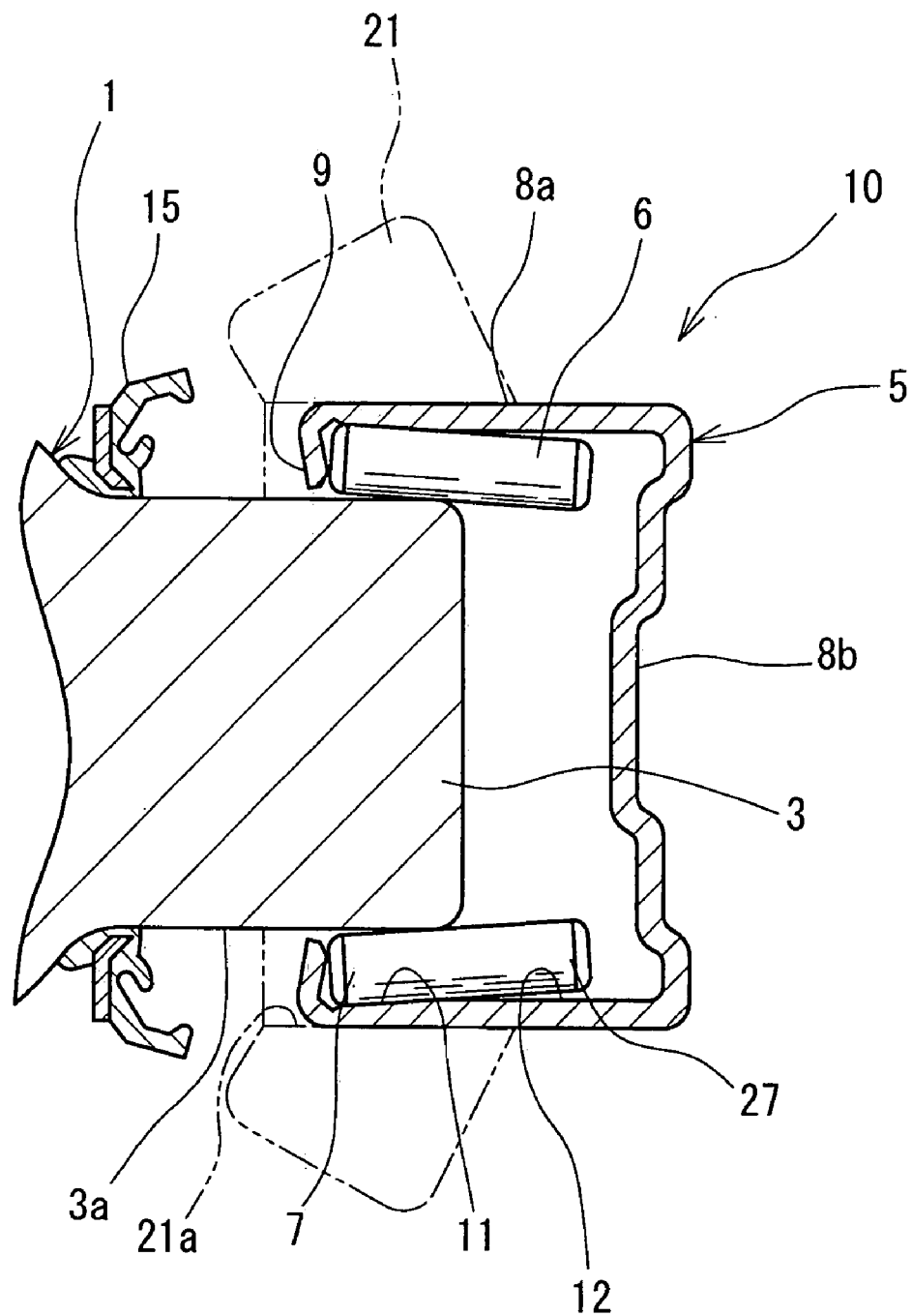
FIG. 6 is a sectional view explaining how to assemble the universal joint.
Figure 7:
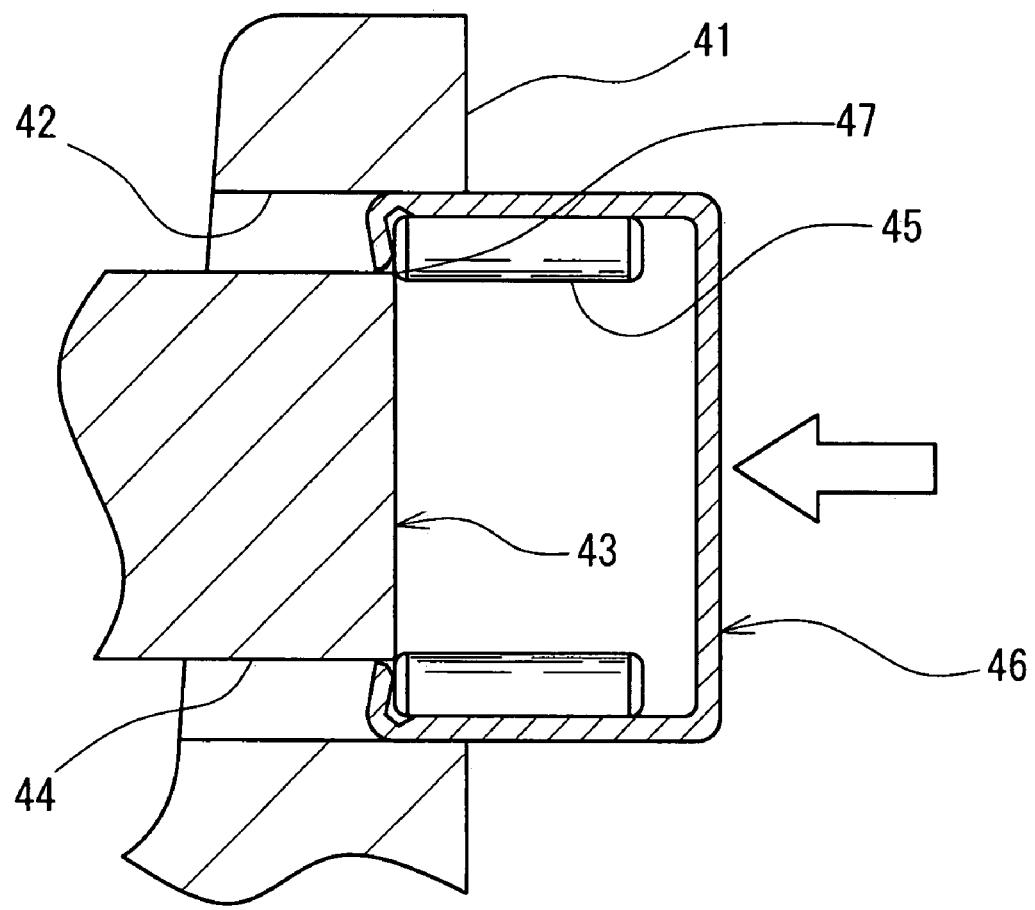
FIG. 7 is a diagram explaining how to assemble a universal joint including a conventional cross joint.

When the needle rollers 6 in the bearing cup 5 are fitted about the shaft portion 3 via distal end thereof, the first end portions 7 side of the needle rollers 6 are pushed by an outside circumference edge of a distal end face of the shaft portion 3, as shown in FIG. 6, while the needle rollers 6 are allowed by the tapered surface portion 11 of the bearing cup 5 to incline as shifting their first end portions 7 radially outwardly. At this time, the needle roller 6 makes a line contact with the tapered surface portion 11 so as be allowed to incline at the same angle in maximum as the angle of inclination of the tapered surface portion 11. This allows the individual needle rollers 6 in the bearing cup 5 to be fitted about the distal end of the shaft portion 3 as distended radially outwardly.

When the bearing cup 5 is started to be fitted in the bearing hole 21a, the bearing cup 5 is elastically decreased in diameter, while the plural needle rollers 6 on the inner periphery of the bearing cup 5 are each slightly moved radially inwardly due to the decreased diameter of the bearing cup 5. Hence, the first end portions 7 of the needle rollers 6 are moved further closer to the distal end of the shaft portion 3.

In this connection, the tapered surface portion 11 has a configuration such that the needle rollers 6 in the bearing cup 5 decreased in diameter may not bring the end faces of the first end portions 7 thereof into hard contact against the outside circumference edge of the distal end face of the shaft portion 3 when the needle rollers 6 in the bearing cup 5 are fitted about the shaft portion 3 by inserting the bearing cup 5 into the bearing hole 21a of the yoke 21. Namely, the tapered surface portion 11 has a slanting configuration to allow the needle rollers 6 to incline along the tapered surface portion 11 so that the respective first end portions 7 of the needle rollers 6 may distend farther radially outwardly away from the distal end of the shaft portion 3.

This prevents the first end faces 7 of the needle rollers 6 from engaging with the outside circumference edge of the distal end face of the shaft portion 3 and making hard contact thereagainst. Therefore, the distal end of the shaft portion 3 and the needle rollers 6 are prevented from being damaged.

The configuration of the tapered surface portion 11 is described in more details with reference to FIG. 4. In the tapered surface portion 11, a difference (D–d) between an inside diameter D of the greater-diameter end portion 16 and an inside diameter d of the smaller-diameter end portion 13 is defined to be greater than a value twice the interference between the needle rollers 6 and the shaft portion 3 of the cross shaft 1, or a value twice the interference between the bearing cup 5 and the bearing hole 21a, whichever is greater. The difference (D–d) may be on the order of 15 to 40 μm, for example. This not only permits the needle rollers 6 in the bearing cup 5 to be smoothly fitted about the shaft portion 3 by inserting the bearing cup 5 into the bearing hole 21a of the yoke 21, but also prevents the shaft portion 3 and the needle rollers 6 from causing damage on each other.

When the bearing cup 5 in the state shown in FIG. 6 is further pressed (advanced), toward the proximal end of the shaft portion 3 in order to fit the needle rollers 6 in the bearing cup 5 completely about the shaft portion 3, the needle rollers 6 held in the inclined position by the tapered surface portion 11 are clamped between the raceway surface 12 of the bearing cup 5 and the outer periphery 3a of the shaft portion 3, so that an axis of the needle rollers 6 is in parallel to the axis of the bearing cup 5. Thus, the needle rollers 6 may be arranged along the raceway surface 12 (state shown in FIG. 3). Once the first end portions 7 of the needle rollers 6 are mounted on the distal end of the shaft portion 3, the needle rollers 6 may be smoothly fitted about the shaft portion 3 simply by axially moving the bearing cup 5. Thus is established the assembled state wherein the needle rollers 6 are arranged along the raceway surface 12 of the bearing cup 5 as shown in FIG. 3.

As shown in FIG. 1, such cross joints 10 are used for interconnecting the steering shaft 31 and the intermediate shaft 33 and for interconnecting this intermediate shaft 33 and the column shaft 32, so as to construct the vehicular steering system wherein the interference fit relation (having the clearance of negative value) or a clearance-free fitting relation is established between the needle rollers 6 on the inner periphery of the bearing cup 5 and the shaft portion 3 of the cross shaft 1. Therefore, the occurrence of slippage between the needle rollers 6 and the shaft portion 3 may be obviated, thereby preventing the occurrence of backlash or pulsations associated with torque transfer failure. Thus is provided a favorable steering feeling. Furthermore, the shaft portions 3 of the cross shaft 1 and the needle rollers 6 rolling on the outer peripheries 3a of the shaft portions 3 may be prevented from sustaining damages. Accordingly, the vehicular steering system may be enhanced in quality and durability.

The invention is not limited to the illustrated embodiment and may be practiced in any other modes which do not depart from the scope of the invention. For instance, the foregoing embodiment illustrates the constitution wherein the interference fit relation (having the clearance of negative value) or the clearance-free fitting relation is established between the needle rollers 6 and the bearing cup 5 and between the needle rollers 6 and the shaft portion 3 when these components are completely assembled. However, the needle rollers 6 and the shaft portions 3 may also be assembled to constitute an alternative universal joint wherein the needle rollers 6 and the shaft portions 3 define a clearance of positive value.

The invention offers the following effect. When the plural needle rollers arranged along the inner periphery of the bearing cup are fitted about the shaft portion of the cross shaft via the distal end thereof, the needle rollers are allowed to incline as shifting the first end portions thereof radially outwardly. Therefore, the end faces of the first end portions of the needle rollers are prevented from engagingly making hard contact against the outside circumference edge of the distal end face of the shaft portion. Hence, the distal end of the shaft portion and the needle rollers may be prevented from being damaged. Thus, the cross joint may be improved in quality and durability.

What is claimed is:

1. A cross joint comprising:
a cross shaft including four shaft portions projecting in four directions from a side periphery of a body portion thereof; a cylindrical bearing cup having a closed end and an open end and including a raceway surface on an inner periphery thereof beginning adjacent to the closed end and extending toward the body portion; and
a plurality of needle rollers having the first end portions thereof located on an opening side of the bearing cup, arranged along the raceway surface of the bearing cup and fitted about the shaft portion,
wherein the inner periphery of the bearing cup includes a tapered surface portion which begins at an end of the raceway surface and extends toward the open end of the cylindrical bearing cup and the needle rollers have a length such that the rollers are coextensive with major portions of both the raceway surface and the tapered surface portion such that the first end portions of the needle rollers pivot radially outwardly against the tapered surface portion when the plural needle rollers arranged along the inner periphery of the bearing cup are fitted about the shaft portion.

2. A cross joint according to claim 1,
wherein the raceway surface is formed continuous to a smaller-diameter end portion of the tapered surface portion.

3. The cross joint of claim 1, wherein the difference between the diameter of an end portion of the tapered surface portion and of the raceway is greater than a value twice the interference between the needle rollers and one of the shaft portions of the cross shaft.

4. The cross joint of claim 1, wherein (1) the raceway surface is formed continuous to a smaller-diameter end portion of the tapered surface portion, (2) the inner periphery of the bearing cup includes a recess at the opening side of the bearing cup, the recess having a diameter larger than that of the tapered surface portion, and (3) the tapered surface portion defines a tapered surface linearly increased in diameter from the cylindrical raceway surface toward a greater-diameter end portion which continuously extends to the recess.

5. A vehicular steering system comprising:
a steering shaft;
a column shaft; and
a joint for interconnecting the steering shaft and the column shaft,
wherein the joint comprises:
a cross shaft including four shaft portions projecting in four directions from a side periphery of a body portion thereof; a cylindrical bearing cup having a closed end and an open end and including a raceway surface on an inner periphery thereof beginning adjacent to the closed end and extending toward the body portion;
a plurality of needle rollers having the first end portions thereof located on an opening side of the bearing cup, arranged along the raceway surface of the bearing cup and fitted about the shaft portion, and
wherein the inner periphery of the bearing cup includes a tapered surface portion which begins at an end of the raceway surface and extends toward the open end of the cylindrical bearing cup and the needle rollers have a length such that the rollers are coextensive with major portions of both the raceway surface and the tapered surface portion such that the first end portions of the needle rollers pivot radially outwardly against the tapered surface portion when the plural needle rollers arranged along the inner periphery of the bearing cup are fitted about the shaft portion.

6. The vehicular steering system of claim 5, wherein the difference between the diameter of an end portion of the tapered surface portion and of the raceway is greater than a value twice the interference between the needle rollers and one of the shaft portions of the cross shaft.

7. The vehicular steering system of claim 5, wherein (1) the raceway surface is formed continuous to a smaller-diameter end portion of the tapered surface portion, (2) the inner periphery of the bearing cup includes a recess at the opening side of the bearing cup, the recess having a diameter larger than that of the tapered surface portion, and (3) the tapered surface portion defines a tapered surface linearly increased in diameter from the cylindrical raceway surface toward a greater-diameter end portion which continuously extends to the recess.

* * * * *